United States Patent [19]

Hergenrother et al.

[11] 4,247,679
[45] Jan. 27, 1981

[54] POLYPHOSPHAZENE COPOLYMERS CONTAINING ACETYLENIC SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,103

[22] Filed: Sep. 8, 1978

[51] Int. Cl.³ .............................................. C08G 83/00
[52] U.S. Cl. ................................... 528/168; 528/374; 528/392; 528/399
[58] Field of Search ........................ 528/399, 168, 392

[56] References Cited

U.S. PATENT DOCUMENTS

| | | | |
|---|---|---|---|
| 2,825,718 | 3/1958 | Hamalainen | 528/399 |
| 3,676,311 | 7/1972 | Frank et al. | 204/159.14 |
| 4,040,843 | 8/1977 | Franko-Filipasic et al. | 106/15 FP |

*Primary Examiner*—Wilbert J. Briggs, Sr.

[57] ABSTRACT

Polyphosphazene copolymers are prepared which contain units represented by the formulas:

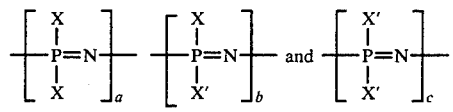

wherein X is —OR'RC—C↑CH in which R and R' are hydrogen or alkyl groups containing from 1 to 6 carbon atoms; wherein X' is selected from the group consisting of substituted and unsubstituted alkoxy, aryloxy, amino and mercapto groups and wherein $20 \leq (a+b+c) \leq 50,000$ per polymer.

The copolymers of the invention can be utilized to form protective films and may also be utilized in applications such as moldings, coatings and the like.

10 Claims, No Drawings

POLYPHOSPHAZENE COPOLYMERS CONTAINING ACETYLENIC SUBSTITUENTS

BACKGROUND OF THE INVENTION

This invention relates to polyphosphazene copolymers containing repeating

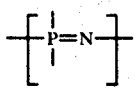

units in the polymer chain in which acetylenic substituents are attached to the phosphorus atom. More particularly, the invention relates to polyphosphazene copolymers containing an acetylenic substituent and a substituted or unsubstituted alkoxy, aryloxy, amino or mercapto substituent.

Polyphosphazene homo- and co- polymers containing repeating

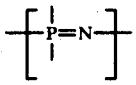

units in which various alkoxy, substituted alkoxy, aryloxy and substituted aryloxy groups are attached to the phosphorus atom and their method of preparation are described in the prior art as illustrated in the publication "Phosphorus-Nitrogen Compounds", Academic Press, New York, New York 1972 by H. R. Allcock and "Poly(Organophosphazenes)", Chemtech, Sept. 19, 1975 by H. R. Allcock and in such U.S. Pat. Nos. as 3,515,688; 3,702,833; and 3,856,712.

SUMMARY OF THE INVENTION

In accordance with this invention, novel polyphosphazene copolymers containing acetylenic and substituted or unsubstituted alkoxy, aryloxy, amino or mercapto substituents are prepared.

The copolymers of the invention contain repeating units represented by the formulas:

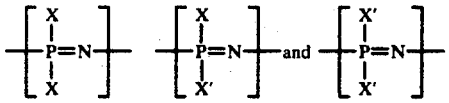

wherein X is —OR'RC—C≡CH in which R and R' are as defined above and X' is selected from the group consisting of alkoxy, aryloxy, amino or mercapto groups. These units are believed to be randomly distributed along the polymer chain.

In the copolymer units represented by the above formulas, all X substituent groups may be the same or they may be mixed and all X' substituent groups may be the same or mixed. In the mixtures, the X substituent groups may be mixtures of different acetylenic groups and the X' substituent groups may be mixtures of different alkoxy, aryloxy, amino and mercaptan groups or mixtures of compounds within each class.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.9 percent by weight of the X' substituent. For applications such as moldings, coatings, foams and the like, the copolymer should contain at least ten (10) percent by weight of the X substituent.

The copolymers are prepared by reacting the poly(dichlorophosphazene) with a mixture of an acetylenic alcohol (defined hereinafter) and a substituted or unsubstituted aliphatic alcohol, aromatic alcohol, amino compound or mercaptan compound in the presence of a tertiary amine.

These copolymers can be used to prepare films and may be utilized in applications such as molding, coatings, and the like.

DETAILED DESCRIPTION OF THE INVENTION

The term "copolymer" as used hereinafter throughout this specification and claims is employed in the broad sense and includes copolymers, terpolymers, tetrapolymers and the like.

As indicated heretofore, the polyphosphazene polymers of this invention are prepared by reacting a poly(dichlorophosphazene) polymer with an acetylenic alcohol and a substituted or unsubstituted aliphatic alcohol, aromatic alcohol, amino compound or mercaptan compound in the presence of a tertiary amine.

I. THE POLY(DICHLOROPHOSPHAZENE) POLYMER

Poly(dichlorophosphazene) polymers which are employed as starting materials in preparing the polymers of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_n$—, in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. THE ACETYLENIC SUBSTITUENTS

The acetylenic substituents of the copolymers of the invention are alkynoxy groups represented by the formula —OR'RC—C≡CH in which R and R' are hydrogen or alkyl groups containing from 1 to 6 carbon atoms. These substituent groups can be derived from aliphatic acetylenic alcohols including primary, secondary and tertiary acetylenic alcohols. Illustrative examples of acetylenic alcohols which may suitably be employed are aliphatic acetylenic alcohols such as 2-propyn-1-ol (propargyl alcohol), 1-pentyn-3-ol, 4-methyl-1-pentyn-3-ol, 1-hexyn-3-ol, 4-ethyl-1-octyn-3-ol, 2-methyl-3-butyn-2-ol (methyl butynol), 3-methyl-1-pentyn-3-ol, 3,5-dimethyl-1-hexyn-3-ol, 1-ethynlcyclohexan-1-ol, 3-hydroxy-1-octyne and the like. Mixtures of such acetylenic alcohols may also be utilized.

Preferred acetylenic alcohols for use in preparing the polymers of the invention are 2-propyn-1-ol (hereinafter propargyl alcohol) and 3-hydroxy-1-octyne.

The presence of an acetylenic substituent in the copolymers of the invention provides for a number of advantageous properties. Thus, the absence of a beta hydrogen in the acetylenic derivative should impart improved thermal stability to the polymer since dehydration cannot readily occur. Moreover, the C≡C group can be reacted with other reagents to convert this group into other derivatives that often cannot be directly prepared.

III. THE ALKOXY, ARYLOXY, AMINO AND MERCAPTO SUBSTITUENTS

As indicated heretofore, the polyphosphazene copolymers of the invention in addition to the aliphatic acetylenic substituent group, i.e. alkynoxy group, may contain substituted or unsubstituted alkoxy, aryloxy, amino or mercapto groups.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; nitro-phenols such as p-, o-, and m-nitrophenols; halogen-substituted phenols such as p-, o-, and m- chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

The preferred substituent groups represented by X' for use in the polymers of the invention are alkoxy groups, especially fluoroalkoxy groups and aryloxy groups, especially nitrophenoxy groups.

IV. THE TERTIARY AMINE

The use of the tertiary amine in preparing the copolymers of the invention minimizes undesirable side reactions and at the same time acts as an effective acid scavenger.

Tertiary amines which may be employed in preparing the polymers of the invention are those represented by the general structure:

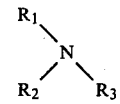

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bycyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer and a mixture of an acetylenic alcohol and a substituted or unsubstituted aliphatic alcohol, aromatic alcohol, amino compound or mercaptan compound in the presence of a tertiary amine.

The specific reaction conditions and proportion of ingredients employed in preparing these copolymers can vary somewhat depending on factors such as the reactivity of the specific substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent or solvent mixture employed in the reaction should be a solvent for the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and is not intended as a limitation on the scope thereof. Parts and percentages referred to in the example are by weight unless otherwise indicated.

EXAMPLE 1

Preparation of [(CH≡CCH$_2$O)(p-NO$_2$C$_6$H$_5$O)PN] Copolymer

Into a 10 oz. bottle was charged 6.12 grams (44 millimoles) of p-nitrophenol, 100 cc of dry tetrahydrofuran (hereinafter THF), 12.3 cc (88 millimoles) of triethylamine and 13.7 grams (40.0 millimoles) of a 33.9 percent solids solution of poly(dichlorophosphazene) (degree of polymerization of about 2600) in cyclohexane. The mixture was heated at 120° C. for 28 hours and produced a purple solution containing triethylamine hydrochloride. To this was added 2.47 grams (44 millimoles) of propargyl alcohol (CHCCH$_2$OH). After 20 hours heating at 90° C., filtering and washing with methanol yielded 8.9 grams of red powder. The solid polymer when pressed at 175° C. under a pressure of 2000 psi formed a smooth continuous film. Analysis of the polymeric product produced the following results:

|              | C     | H    | N     | P     | Cl   |
| ------------ | ----- | ---- | ----- | ----- | ---- |
| Actual (%)   | 42.22 | 3.68 | 14.50 | 11.41 | 1.00 |
| Calculated* (%) | 43.24 | 2.71 | 11.96 | 10.39 | 0.38 |

*Based on 1.5 percent triethylamine hydrochloride 81.5 percent p-nitrophenol derivative and 12.7 percent propargyl alcohol derivative.

EXAMPLE 2

Preparation of

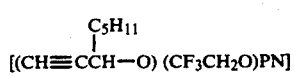
[(CH≡CCH—O) (CF$_3$CH$_2$O)PN]

Copolymer

Into a 10 oz bottle was charged 5.55 grams (44 millimoles) of 3-hydroxy-1-octyn

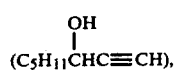
(C$_5$H$_{11}$CHC≡CH), 100 cc of THF, 12.3 cc (88 millimoles) of triethylamine, 3.2 cc (44 millimoles) of trifluoroethanol, and 13.7 grams (40.0 millimoles) of a 33.9 percent solids solution of poly(dichlorophosphazene) in cyclohexane. The mixture was heated for 20 hours at 120° C. Then, an additional 3.2 cc (44 millimoles) of trifluoroethanol was added to the bottle and the contents thereof heated for four (4) hours at 120° C. Following methanol coagulation, 4.88 grams of a red rubbery polymer was obtained. An additional 2.40 grams of polymer product was obtained by washing the salt layer with methanol.

An IR of the polymer product showed no sign of a P-Cl band at 600 cm$^{-1}$ indicating substantial conversion. New bands were observed at 562, 538, and 518 cm$^{-1}$. Elemental analysis of the polymer product produced the following results.

|                | C     | H    | N    | P     | Cl   |
| -------------- | ----- | ---- | ---- | ----- | ---- |
| Actual (%)     | 27.84 | 3.73 | 7.93 | 14.63 | 0.51 |
| Calculated(%)* | 27.84 | 3.72 | 7.13 | 14.99 | 0.89 |

*Based on 3.5 percent triethylamine hydrochloride, 13.8 percent hydrolyzed chloropolymer, 56.5 percent trifluoroethanol derivative and 22.9 percent 3-hydroxy-1-octyne derivative.

We claim:

1. A soluble polyphosphazene copolymer containing units represented by the formulas:

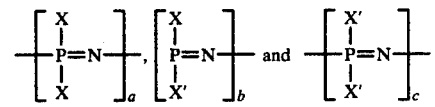

wherein X is —OR'RC—C≡CH in which R and R' are hydrogen or alkyl groups containing from 1 to 6 carbon atoms; wherein X' is selected from the group consisting of substituted and unsubstituted alkoxy, aryloxy, amino and mercapto groups, and wherein 20≦(a+b+c)≦50,000 per polymer.

2. The copolymer of claim 1 wherein X is CH≡C—CH$_2$O—.

3. The copolymer of claim 1 wherein X is

4. The copolymer of claim 2 wherein X' is p-NO$_2$C$_6$H$_5$O—.

5. The copolymer of claim 3 wherein X' is CF$_3$CH$_2$O—.

6. A method of preparing soluble polyphosphazene copolymers containing units represented by the formulas:

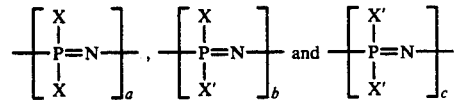

wherein X is —OR'RC—C≡CH in which R and R' are selected from the group consisting of hydrogen and alkyl radicals containing from 1 to 6 carbon atoms; wherein X' is selected from the group consisting of substituted or unsubstituted alkoxy, aryloxy, amino and mercapto groups and wherein 20≦(a+b+c)≦50,000, said method comprising reacting a soluble poly(dichlorophosphazene) polymer having the formula —(NPCl$_2$)$_n$—, wherein n is from 20 to 50,000, with a mixture of an aliphatic acetylenic alcohol having the structure CH≡C—CRR'OH wherein R and R' are as defined above and a substituted or unsubstituted aliphatic alcohol, aromatic alcohol, amino compound or mercaptan compound in the presence of a tertiary amine.

7. The method of claim 6 wherein said acetylenic alcohol is propargyl alcohol.

8. The method of claim 6 wherein said acetylenic alcohol is 3-hydroxy-1-octyne.

9. The method of claim 6 wherein said mixture consists of propargyl alcohol and p-nitrophenol.

10. The method of claim 6 wherein said mixture consists of 3-hydroxy-1-octyne and trifluoroethanol.